United States Patent [19]

Leicht

[11] Patent Number: 5,322,053

[45] Date of Patent: Jun. 21, 1994

[54] SOLAR COOKING PANEL APPARATUS

[76] Inventor: Otto H. Leicht, 99 Woodland Ave., Fords, N.J. 08863-1721

[21] Appl. No.: 116,567

[22] Filed: Sep. 7, 1993

[51] Int. Cl.⁵ .................................................. F24J 2/02
[52] U.S. Cl. .................................... 126/681; 126/696; 359/851
[58] Field of Search .............. 126/696, 697, 692–695, 126/680, 681, 682; 359/853, 851

[56] References Cited

U.S. PATENT DOCUMENTS

| 1,424,932 | 8/1922 | Moreau | 126/680 |
| 3,896,786 | 7/1975 | Clevett | 126/684 |
| 4,423,926 | 1/1984 | Stolpin | 126/696 |
| 4,583,521 | 4/1986 | Ciambella | 126/680 |
| 4,625,709 | 12/1986 | Brandstatter | 126/696 |

FOREIGN PATENT DOCUMENTS 2588644 4/1987 France .................... 126/681

Primary Examiner—James C. Yeung
Attorney, Agent, or Firm—E. Michael Combs

[57] ABSTRACT

A cooking panel member formed of a plurality of individual panel reflector plates includes first and second inner rows of individual panel plates hingedly mounted together, with first and second outer rows of panel plates interconnected to the inner rows of plates to provide a completed arcuate member having a concave surface to reflect heat to a cooking vessel.

2 Claims, 5 Drawing Sheets

SOLAR COOKING PANEL APPARATUS

BACKGROUND OF THE INVENTION

1. Field of the Invention

The field of invention relates to solar panel structure, and more particularly pertains to a new and improved solar cooking panel apparatus wherein the same is arranged to direct reflected heat and light to a central cooking chamber.

2. Description of the Prior Art

The instant invention attempts to overcome deficiencies of the prior art by providing for a panel member arranged for disassembly and permitting pivoting of the panels relative to one another to provide for deformation of the panel in an assembled configuration to reflect heat relative to a focal position of a cooking pot and the like.

SUMMARY OF THE INVENTION

In view of the foregoing disadvantages inherent in the known types of solar panel apparatus now present in the prior art, the present invention provides a solar cooking panel apparatus wherein the same is arranged to include a matrix of individual reflective plates to focus light to a central position upon positioning the reflector structure in a concave configuration. As such, the general purpose of the present invention, which will be described subsequently in greater detail, is to provide a new and improved solar cooking panel apparatus which has all the advantages of the prior art solar panel apparatus and none of the disadvantages.

To attain this, the present invention provides a cooking panel member formed of a plurality of individual panel reflector pates, including first and second inner rows of individual panel plates hingedly mounted together, with first and second outer rows of panel plates interconnected to the inner rows of plates to provide a completed arcuate member having a concave surface to reflect heat to a cooking vessel.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved solar cooking panel apparatus which has all the advantages of the prior art solar panel apparatus and none of the disadvantages.

It is another object of the present invention to provide a new and improved solar cooking panel apparatus which may be easily and efficiently manufactured and marketed.

It is a further object of the present invention to provide a new and improved solar cooking panel apparatus which is of a durable and reliable construction.

An even further object of the present invention is to provide a new and improved solar cooking panel apparatus which is susceptible of a low cost of manufacture with regard to both materials and labor, and which accordingly is then susceptible of low prices of sale to the consuming public, thereby making such solar cooking panel apparatus economically available to the buying public.

Still yet another object of the present invention is to provide a new and improved solar cooking panel apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
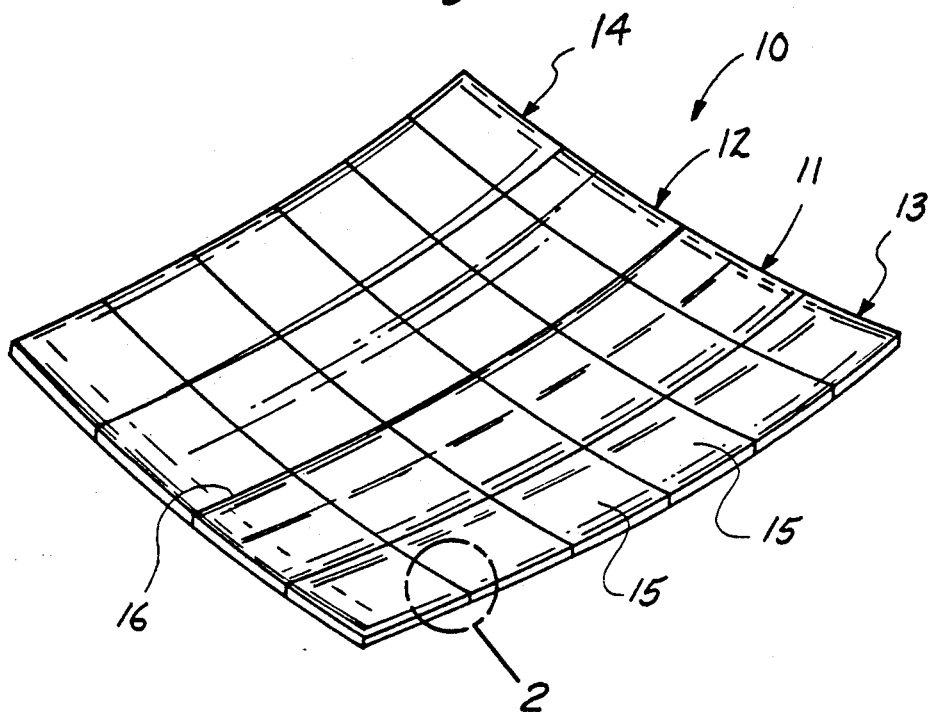
FIG. 1 is an isometric illustration of the invention.

With reference now to the drawings, and in particular to FIGS. 1 to 10 thereof, a new and improved solar cooking panel apparatus embodying the principles and concepts of the present invention and generally designated by the reference numerals 10 and 10a will be described.

Figure 2:
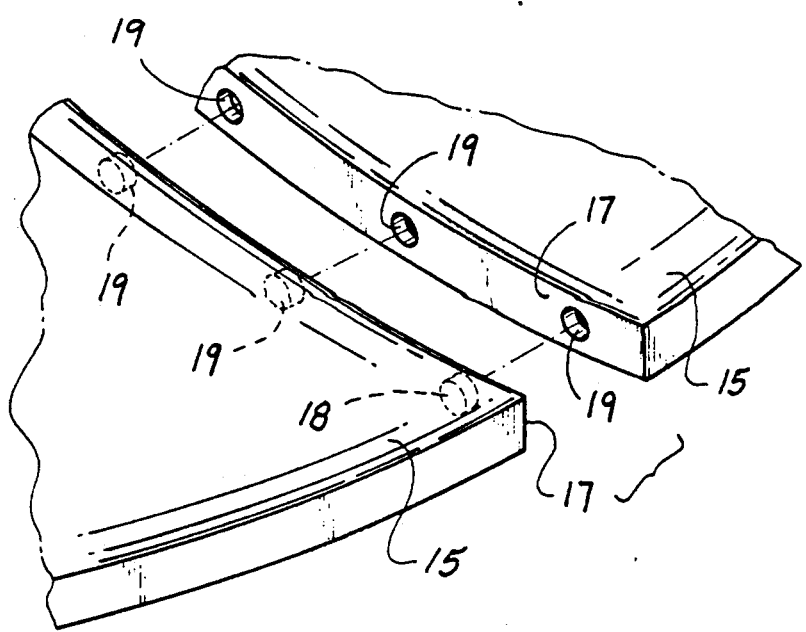
FIG. 2 is an enlarged isometric illustration of section 2 as set forth in FIG. 1.

More specifically, the solar cooking panel apparatus 10 of the instant invention essentially comprises a matrix of reflector plates 15, each of a generally square configuration, having plate facing walls 17 that are arranged to face an adjacent one of the reflector plates 15, as indicated in FIG. 2. First and second facing inner rows of plates 11 and 12 are optionally joined together by a central hinge 16, or alternatively may employ the use of connector plugs 18 that are received within facing wall apertures 19 of facing wall portions 17, as indicated in FIG. 2. First and second outer rows of the reflector plates 13 and 14 are mounted by the use of the plug members to the respective first and second inner rows of reflector plates 11 and 12.

In use, and in this manner, the outer rows may be separably mounted relative to the inner rows, with the inner rows arranged for folding relative to one another for compact storage of the construction. As noted, the first and second inner rows 11 and 12 may also be interconnected by the use of facing wall apertures 19 having an individual connecting plug 18 into a pair of facing wall apertures 19.

Figure 3:
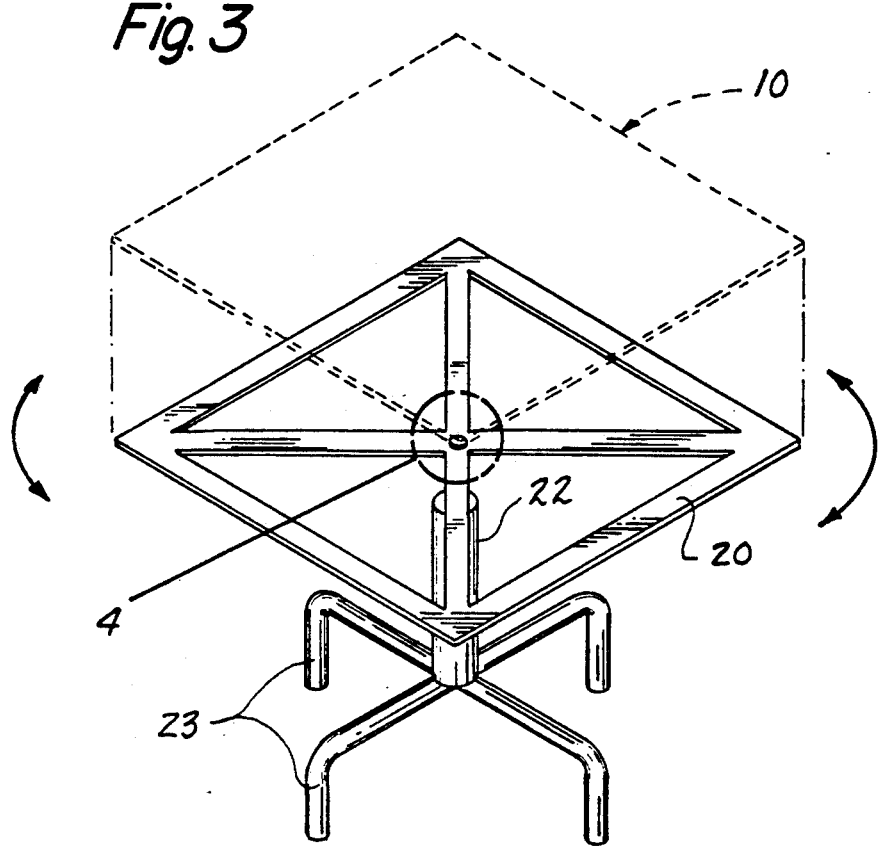
FIG. 3 is an isometric illustration of the invention arranged for mounting upon a support structure.
Figure 4:
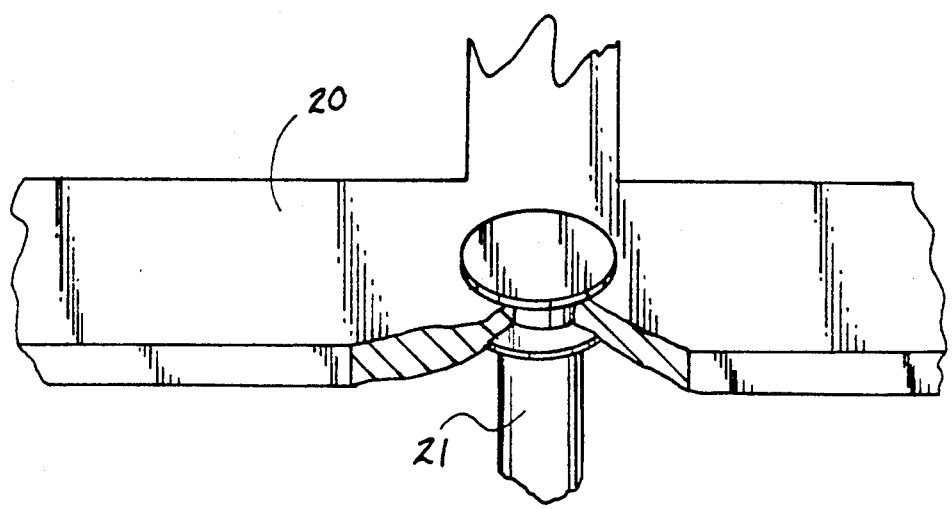
FIG. 4 is an enlarged isometric illustration of section 4, partially in section, as set forth in FIG. 3.

The FIG. 3 indicates the use of a rectilinear support frame 20 arranged to receive the panel 10 thereon, with the support frame 20 having a central support axle 21 pivotally and orthogonally mounted medially of the support frame 20 that is received within a central hub 22, that in turn has support legs 23 to permit rotation of pivoting as well as positioning of the support frame structure and the associated panel 10.

Figure 5:
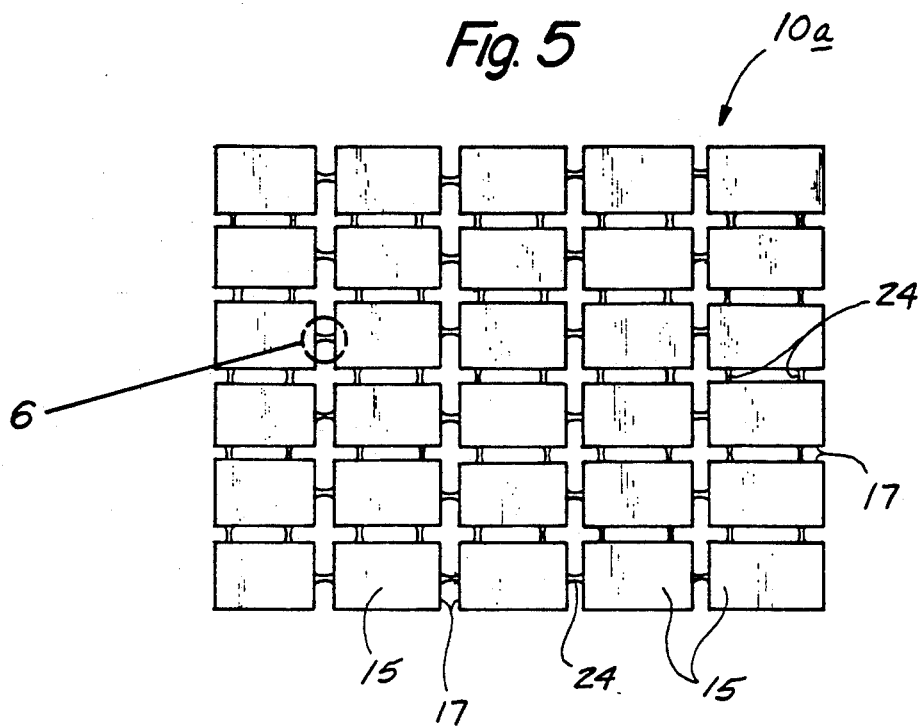
FIG. 5 is an isometric illustration of a modified panel structure, as indicated by the invention.
Figure 6:
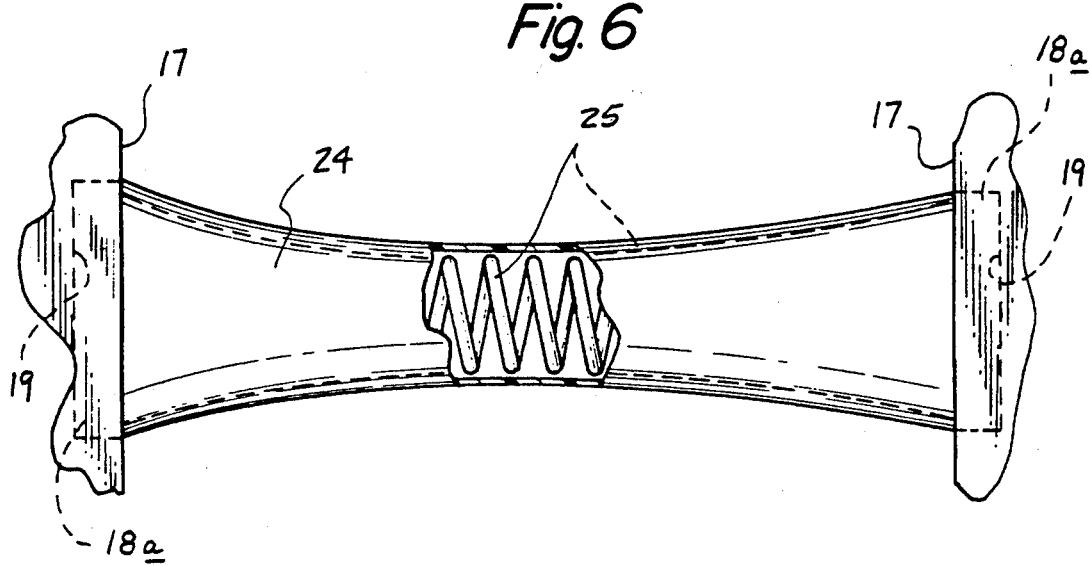
FIG. 6 is an enlarged orthographic view, partially in section, of section 6 as set forth in FIG. 5.

The FIG. 5 indicates the use of a modified panel apparatus 10a, wherein each of the reflector plates 15, and more specifically the facing wall portion 17, include at least one flexible tubular connecting member 24 extending therebetween. Each of the tubular connecting members 24 (see FIG. 6) includes a spring 25 directed coextensively between the facing wall 17 of adjacent reflector plates 15. Further, each of the tubular connector members 24 themselves include a plug portion 18a that is received within an associated facing wall aperture 19 to mount the individual connector members 24 between the individual reflector plates 15, as illustrated.

Figure 7:
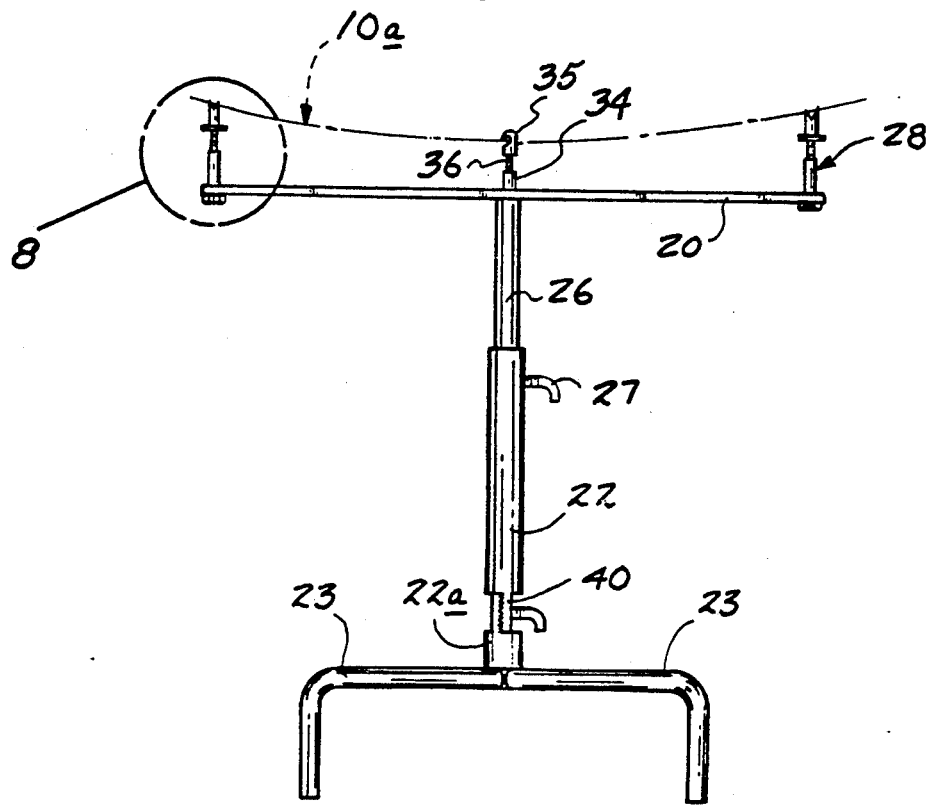
FIG. 7 is an orthographic side view of the modified panel structure arranged for mounting upon an associated support structure.
Figure 8:
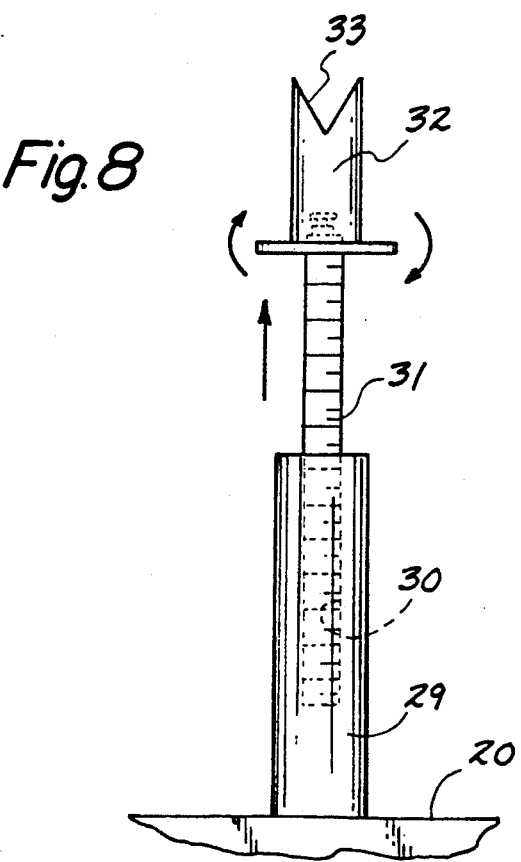
FIG. 8 is an enlarged orthographic view of section 8 as set forth in FIG. 7.

A support framework for the modified panel apparatus 10a includes the use of a central hub 22 (see FIG. 7) mounted pivotally to a lower hub 22a that in turn includes support legs 23 fixedly secured thereto. The pivotal mounting of the central hub 22 to the lower hub 22a about connector 40 permits at least 90 degree tilting of the support frame. This includes 45 degree tilting to either side of the lower hub 22a to accommodate movement of the sun and reorienting of the solar panel structure to that movement. A telescoping hub portion 26 extends from the central hub 22 utilizing a latch rod 27 to secure adjustably the telescoping hub 26 relative to the central hub 22. The support frame mounted orthogonally relative to the telescoping hub 26 includes a central hub 34 medially and orthogonally mounted relative to the support frame 20, wherein the central hub 34 includes a hook member 35 mounted onto a hook member rod 36 that in turn is threadedly received within the central hub 34. The hook member 35 is arranged to receive one of the tubular connecting members 24 medially of the panel 10a, wherein each corner portion of the support frame 20 incudes a corner support tube 29 having an internally threaded socket 30 that receives an adjuster rod 31 threadedly therewithin. The adjuster rod 31 includes an adjuster rod head 32 pivotally mounted to an upper distal end of the adjuster rod 31, with each adjuster rod head 32 including a top wall notch 33 to receive a further one of the connector members 24. In this manner, vertical adjusting of the hook member, as well as the adjuster rod head 32 or each adjuster rod structure, permits bowing of the organization, in a manner as indicated in FIG. 7, to permit adjusting of the curvature of the panel apparatus.

Figure 9:
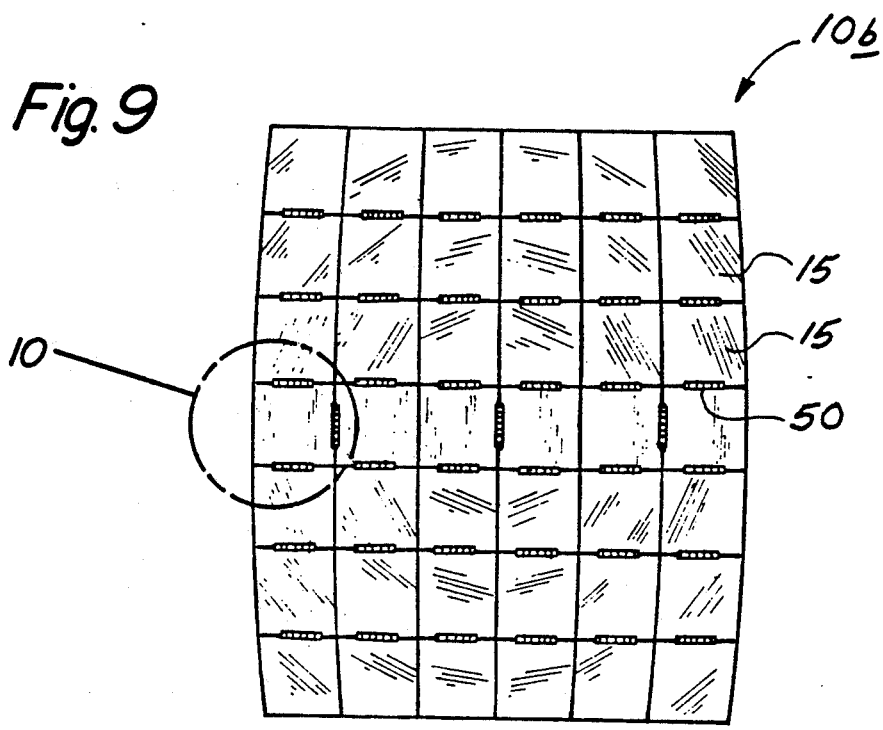
FIG. 9 is an orthographic top view of the solar panel structure having hinged mounting of the various panels together.
Figure 10:
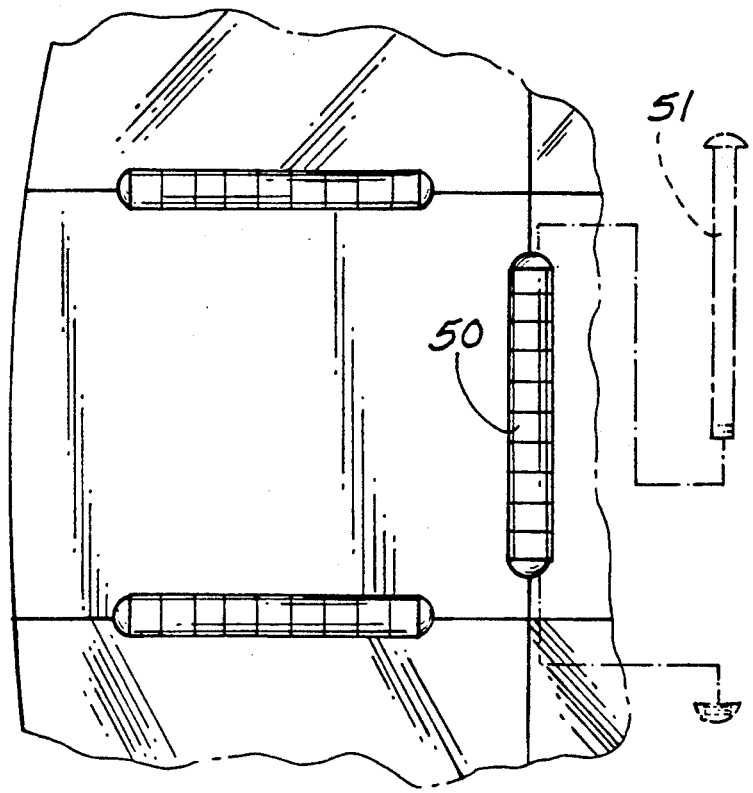
FIG. 10 is an enlarged orthographic view of section 10 as set forth in FIG. 9.

The FIGS. 9 and 10 indicate use of hinge structure interconnecting the individual reflector plates 15 to accommodate various movement and conformation of the panel apparatus 10b. Further it should be noted that there are hinge members mounted between adjacent vertical rows of the plates 15 to permit over-folding of the outer rows relative to the central rows to permit the panels to be over-folded during storage and the like. The hinges may be employed in addition to the connector structure, as indicated in the FIG. 6 for example, such as in hinge pins 51 relative to each of the hinges permitting separation of the various panel plates to this end.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A solar cooking panel apparatus, comprising,
a matrix of reflector plates mounted in adjacency relative to one another, including a first inner row of reflector plates and a second inner row of reflector plates in a facing relationship, and a first outer row of reflector plates mounted to the first inner row of reflector plates, and a second outer row of reflector plates mounted to the second inner row of reflector plates, wherein each reflector plate of said reflector plates includes a facing wall relative to an adjacent one of said reflector plates, and each facing wall includes at least one facing wall aperture to include a connecting member between confronting facing wall apertures, and each connector member includes a flexible, tubular outer shell having a spring member extending between adjacent reflector plates of said reflector plates.

2. An apparatus as set forth in claim 1 including a support structure having a central hub, the central hub including a plurality of support legs extending from the central hub, the central hub including a telescoping hub portion, and the telescoping hub portion including a support frame, wherein the support frame is orthogonally mounted to the central hub medially of the support frame, and the support frame includes a plurality of corner supports, wherein each corner support includes a corner support tube, and each corner support tube including an internally threaded socket, each internally threaded socket having an adjuster rod directed into said socket, and each adjuster rod including an adjuster rod head, with each adjuster rod head having a top wall notch to receive one of said connector members, and a central hub oriented medially and orthogonally relative to the support frame, the central hub having a central hub rod threadedly directed into the central hub, and the central hub rod including a hook member, and the hook member arranged for receiving one of said connector members therewithin.

* * * * *